US008223358B2

(12) United States Patent
Czyszczewski et al.

(10) Patent No.: US 8,223,358 B2
(45) Date of Patent: Jul. 17, 2012

(54) PRINTER OUTPUT COVERAGE ESTIMATION SYSTEM

(75) Inventors: Joseph S. Czyszczewski, Longmont, CO (US); Larry M. Ernst, Longmont, CO (US); Mark G. Finlan, Atlanta, GA (US); James T. Smith, II, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1437 days.

(21) Appl. No.: 11/380,805

(22) Filed: Apr. 28, 2006

(65) Prior Publication Data

US 2007/0253017 A1 Nov. 1, 2007

(51) Int. Cl.
*G06F 3/12* (2006.01)

(52) U.S. Cl. .......... 358/1.15; 358/1.13; 399/79; 399/24; 399/27; 347/7; 347/85

(58) Field of Classification Search ................. 358/1.15, 358/1.13; 399/79, 24, 27; 347/7, 85
See application file for complete search history.

(56) References Cited

U.S. PATENT DOCUMENTS

| | | | | |
|---|---|---|---|---|
| 5,659,795 | A * | 8/1997 | Duvall et al. | 710/15 |
| 6,196,663 | B1 * | 3/2001 | Wetchler et al. | 347/43 |
| 6,356,359 | B1 | 3/2002 | Motamed | |
| 7,042,585 | B1 * | 5/2006 | Whitmarsh et al. | 358/1.15 |
| 7,239,408 | B1 * | 7/2007 | Whitmarsh et al. | 358/1.15 |
| 7,242,490 | B1 * | 7/2007 | Palmer et al. | 358/1.15 |
| 7,321,441 | B2 * | 1/2008 | Matsugi | 358/1.15 |
| 7,342,695 | B2 * | 3/2008 | Matsugi | 358/531 |
| 2002/0032645 | A1 | 3/2002 | Nozaki et al. | |
| 2002/0154335 | A1 * | 10/2002 | Matoba et al. | 358/1.15 |
| 2003/0028415 | A1 | 2/2003 | Herschap et al. | |
| 2003/0061091 | A1 | 3/2003 | Amaratunga et al. | |
| 2003/0115156 | A1 | 6/2003 | Baker | |
| 2003/0149603 | A1 | 8/2003 | Ferguson et al. | |
| 2004/0008379 | A1 * | 1/2004 | Ducato et al. | 358/1.18 |
| 2004/0085551 | A1 * | 5/2004 | Serisky et al. | 358/1.1 |
| 2007/0263820 | A1 * | 11/2007 | Czyszczewski et al. | 379/201.12 |

FOREIGN PATENT DOCUMENTS

JP 409134098 A 10/1995

* cited by examiner

*Primary Examiner* — Jacky X Zheng
(74) *Attorney, Agent, or Firm* — Duft Bornsen & Fishman, LLP

(57) ABSTRACT

A printer output coverage estimation system permits a user of print services to obtain an accurate estimate of the amount of toner required by a print job. Providers of print services, including coverage estimations, may be identified through the Internet and selected by the user from a web interface. The estimate request may then be transmitted directly to the provider that fulfills the request using excess computing capacity. Alternatively, providers may register excess computing capacity with a broker. The broker matches job requests with a grid of providers and directs the job request to the matched provider(s). Thus, users of print services have an alternative to purchasing in-house computing resources that may remain idle much of the time.

17 Claims, 4 Drawing Sheets

PRINTER OUTPUT COVERAGE ESTIMATION SYSTEM

RELATED APPLICATION DATA

The present application is related to commonly-assigned and co-pending U.S. patent application Ser. No. 11/380,834, entitled PRINTING WORKFLOW SERVICES, filed on Apr. 28, 2006, of which the application is incorporated herein by reference in its entirety.

TECHNICAL FIELD

The present invention relates generally to printing services and, in particular, to providing web-based and grid-based tools to more accurately estimate toner usage.

BACKGROUND ART

Due to growing pressure among competitors in regards to pricing in recent years, the production print industry has been struggling to trim print cost. These costs include: printers and peripheral devices, including maintenance and click charges; print servers and processors specific to the pre-processing of print files; paper; toner and other supplies; floor space; special air conditioning and monitoring equipment; power; operations staff; management overhead; disposal of waste paper; and disaster contingency. Among all major cost factors, supply costs remain highest on the list of factors that most customers are unable to measure with more than one-fourth of the total cost of printing and more than two-thirds of supply costs due to a single component toner. It would seem that estimating toner usage, either at the pre-flight stage or at run-time, would be straightforward and achievable. However, various factors, especially environment-related parameters directly associated with specific print shops, seriously complicate the task of precisely estimating toner usage. Such a task is further complicated by the limitations of existing technology and customers' tight budgets.

One common method for estimating toner usage involves some form of averaging. There are also a number of inexpensive "percent coverage" calculating tools on the market. Such tools take either a highlighted portion of a screen or a page of a Post Script file and generate numerical coverage for the selected portion. They claim to target both print shops and home printer users, but seem to require an immense amount of human involvement and, because they do not take into account the characteristics of the actual printer used, among other factors, they may lack sufficient accuracy in many cases. Whether toner usage is estimated by averaging or by the use of one of the available tools, the approach is error-prone and over time contributes to inconsistency and unpredictability in the businesses' pricing and cost-accounting systems.

Calculating accurate toner estimates is a computationally intensive process. Moreover, the "output" industry is highly cyclical based on monthly, quarterly, seasonal or annual needs of printers' customers. For example, a printer whose customers generate monthly bills may have a large volume of work for a short period of each month and a smaller volume the rest of the month. The same printer may have an even larger volume during the spring when many publicly-held companies generate annual reports. If the printer acquires print capacity to handle its normal volume of work, it may not be able to accommodate large, cyclical volumes. Conversely, if the printer acquires print capacity (including hardware) for its peak volume, much of that capacity may sit idle the rest of the time. Thus, sizing for peak loads leads to increased costs and wasted capacity.

Consequently, those in the industry are seeking a tool that is capable of accurately estimating toner usage and does not require the acquisition of substantial in-house computing resources in excess of day-to-day needs.

SUMMARY OF THE INVENTION

The present invention provides a method for generating printer output coverage estimates. A user interface is provided to a user and a job request, including a request for an output coverage estimate, is received through the user interface. The job request is then matched with an external provider of computing services and the job request sent to the matched provider. Upon fulfillment of the job request, the output coverage estimate is received from the computing services provider and made available to the user.

The present invention further provides a printer output estimation system. The system includes a computing resource registry with which computing services providers register excess computing capacity a user interface through which a user submits a request for a printer output coverage estimate, a processor for matching a request with one or more providers, a resource interface through which the request is transmitted to the one or more matched providers whereby the request is fulfilled, and means for user access to the results of the fulfilled request.

The user may transmit a job request directly to a provider through a web-based interface or may transmit the job request to a broker for matching with a provider.

DETAILED DESCRIPTION OF THE PREFERRED EMBODIMENT

Rather than employing a single, one-size-fits-all equation, the present invention provides a customized toner estimation tool that is based on inputs from each individual print customer. The input parameters may include, although not necessarily exclusively, some or all of the following:

- Percent coverage (the ratio of black pixels to total number of pixels on the printable area of the page);
- Distribution of toner pixels on a page (presence of adjacent toner pixels increases toner usage for given pixel);
- Contrast settings;
- PQE settings;
- Other electrostatic adjustments, e.g., mag brushy corona wires;
- Age of developer mix;
- Age of photoconductor (drum);
- Printer model;
- $2^{nd}$ order effects (e.g., toner, paper, humidity);
- Number of sheets of paper used; and
- Amount of toner actually used.

To generate a customized estimation algorithm, a user provides information about the foregoing factors obtained from actual print jobs. A customized toner estimation algorithm may then be generated. In use for a new print job, values for these parameters (other than the amount of toner actually used) are entered and an estimated value for the amount of toner to be used will be generated. Such highly customized and complex calculations may be beyond the capabilities of many in-house print-related computers, or at least would consume significant computing resources to the detriment of other tasks. Moreover, the algorithm may be fine tuned on an on-going basis as information from additional print jobs is taken into account. Based on the estimated toner usage, a printer may calculate a reasonably accurate print cost. For a provider of printing services, having an accurate toner usage estimate permits more accurate quotes for print jobs, thereby reducing over-or under-bidding. For the originator of a print job (user or customer), having an accurate toner usage estimate permits more accurate budgeting and also permits the user to modify the format or layout of a print job to fit an existing budget if necessary.

Figure 1:
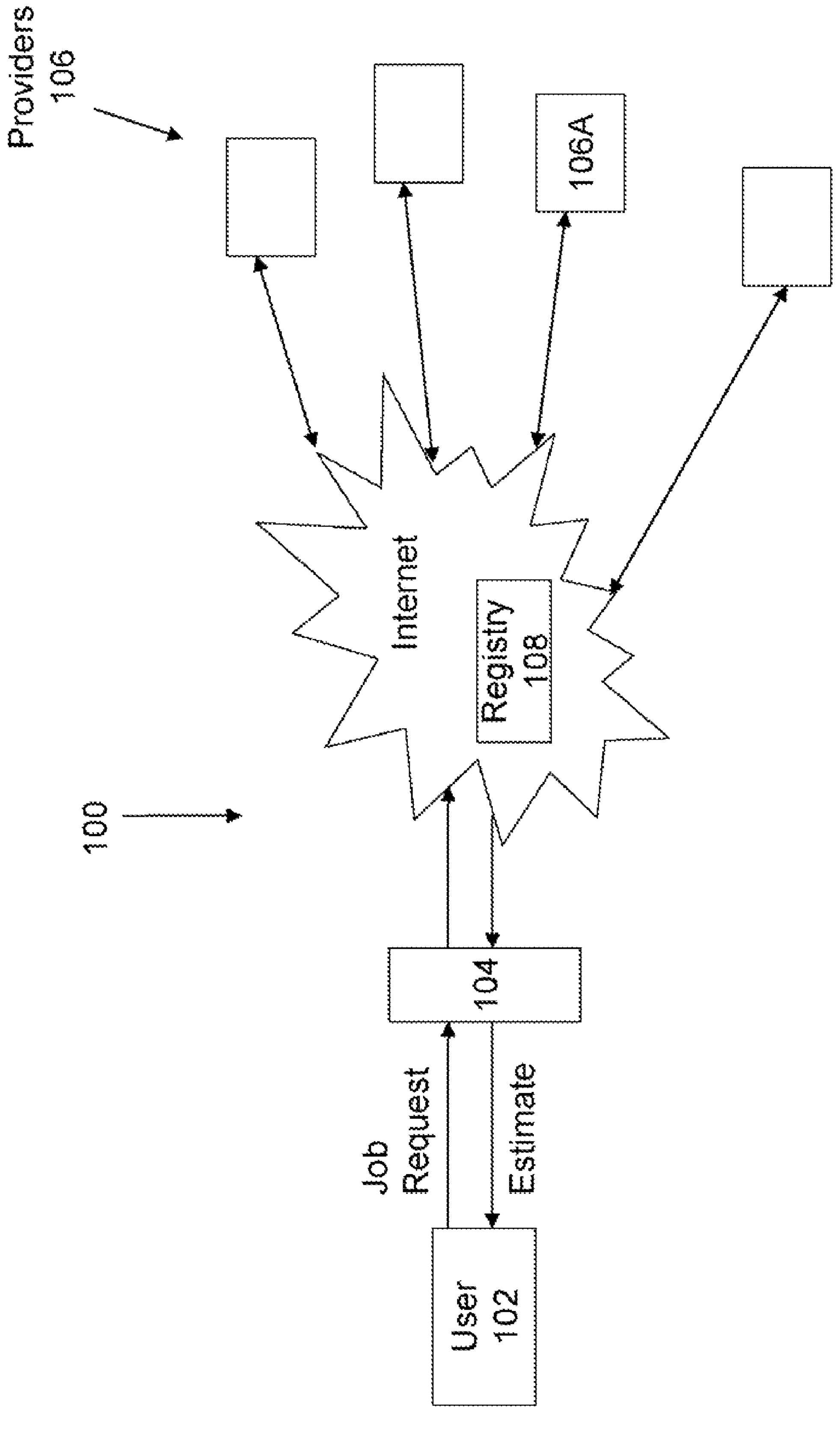
FIG. 1 illustrates such a web-based system according to the present invention.

As previously noted, calculating accurate toner estimates is a computationally intensive process. Consequently, the present invention provides both web-based and grid-based external resources for calculating toner usage estimates to provide users with external computing resources. In a web-based service, the user (client) communicates directly with an external estimation provider through a user interface via the Internet. As used herein, the term "user interface" may refer to an interface through which a human user interacts with the system or may refer to an interface through which other computing resources interact with the system. FIG. 1 illustrates such a web-based system 100. A user 102 logged onto the Internet through an interface 104 may search for providers 106 of output coverage estimation services. Upon selecting one provider 106A that meets the user's 102 requirements, the user 102 submits a job request for a printer output estimate to the selected provider 106A. Upon completion of the job, the provider 106A returns the output estimate to the user 102. In a variation of the embodiment of FIG. 1 providers may register with a registry 108 that provides a central web location for a potential user to select a provider which meets its particular needs.

Figure 2:
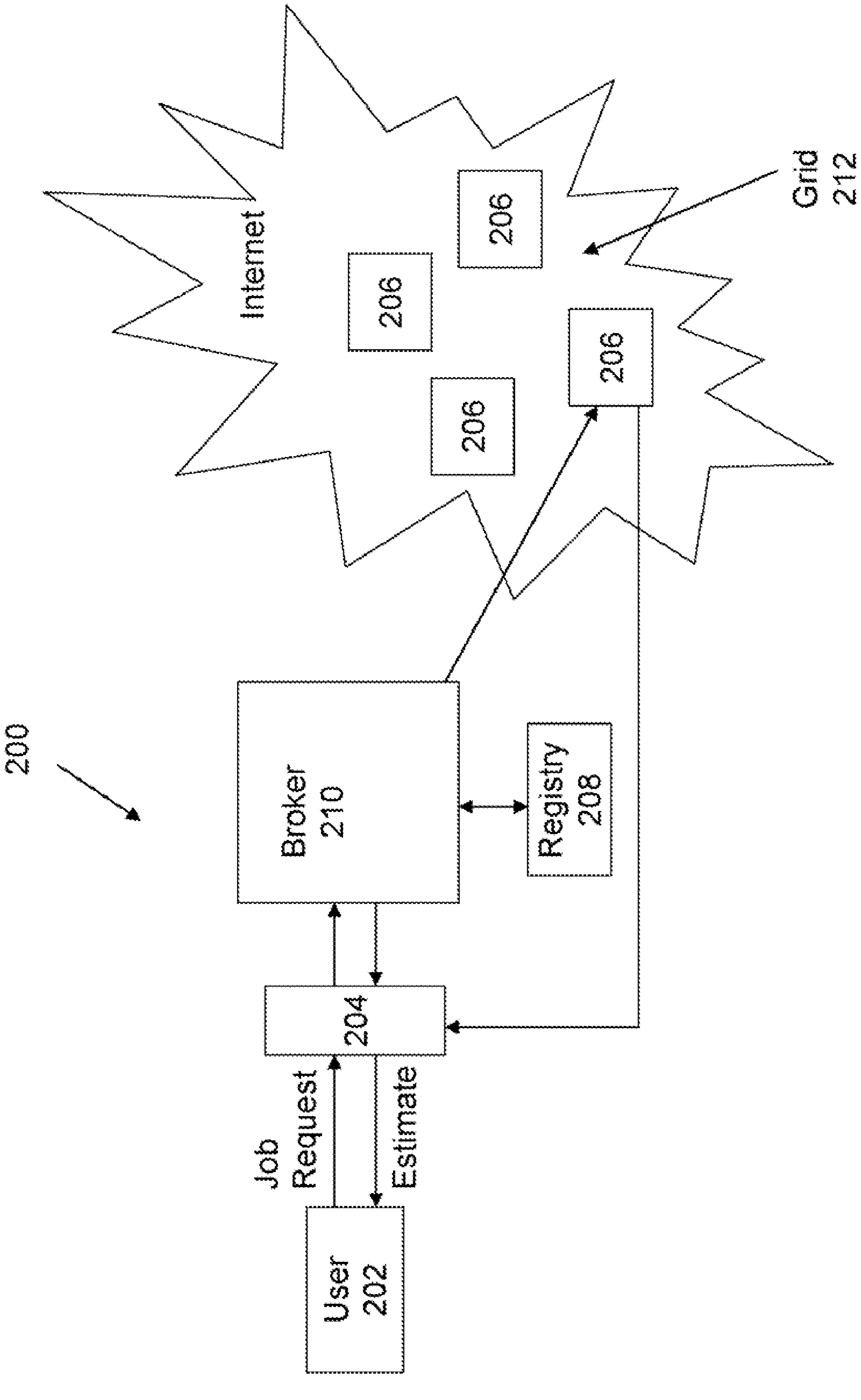
FIG. 2 illustrates a grid-based system according to another embodiment of the present invention.

FIG. 2 illustrates a grid-based system 200. Providers 206 in a grid 212 register unused computing capacity with a broker 210. Users 202 submit job requests through an appropriate interface 204 to the broker 210. For a fee, the broker 210 then matches job requests with providers 206 that are accessible on the Internet. In the grid-based service of FIG. 2, the ultimate provider(s) 206 may be unknown to the user 202 that is only purchasing output coverage estimation services. A provider may itself also be a user and may purchase needed output coverage estimate service from the broker. The registry 208 may be integrated into the broker 210 or may be accessible on the Internet, in the manner illustrated in FIG. 1.

In both embodiments, the user only pays the provider for the computing capacity required to compute the requested coverage estimates, and only when the service is requested. The computing service provider is able to sell excess coverage estimation capacity during times of low utilization, thereby reducing wasted resources.

Figure 3A:
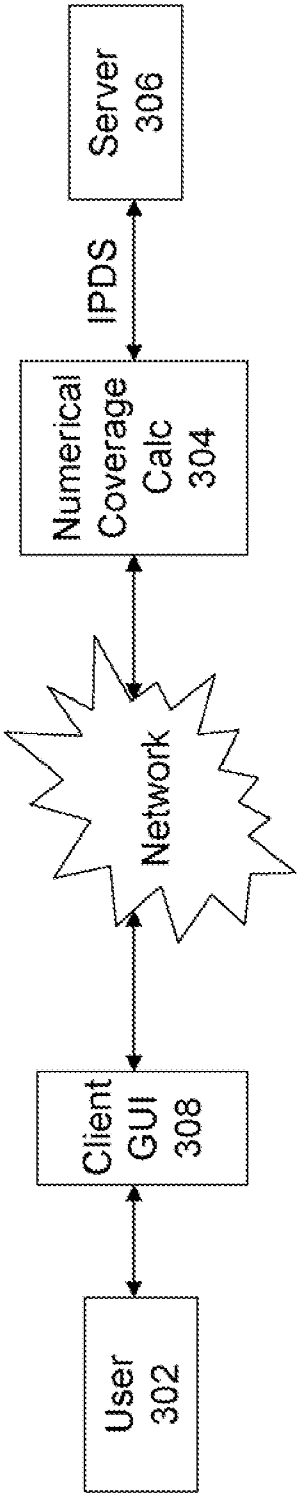
FIGS. 3A and 3B illustrate variations of an embodiment of the present invention.
Figure 3B:
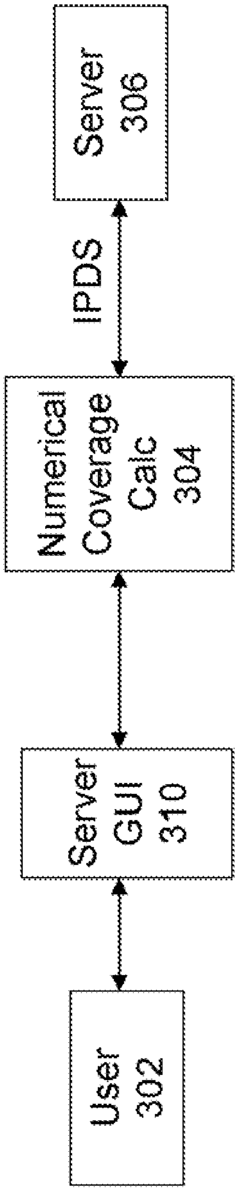

FIGS. 3A and 3B illustrate variations of an embodiment of the present invention in which a user 302 submits a print job to a printer server 306. The printer server 306 generates an Intelligent Printer Data Stream (IPDS), or data in another printing protocol, containing information used to identify, monitor, and control the functions of a printer (not shown). It should be understood that without loss of generality the printer server and the printer may be a single integrated device or two independent devices.

A coverage calculator 304 converts the IPDS into a TIFF file that is used to calculate estimated toner coverage for the job. The calculator 304 may output the toner coverage estimate in any appropriate file format for communicating the results to the requester of the service. The user 302 may then open an interface on a client machine 308 (FIG. 3A) that displays the names of jobs completed on the printer server 306. The user may then select the desired job from the list and display the results. Alternatively, the user 302 may view the estimated toner coverage for job files directly on a server 310 (FIG. 3B).

Figure 4A:
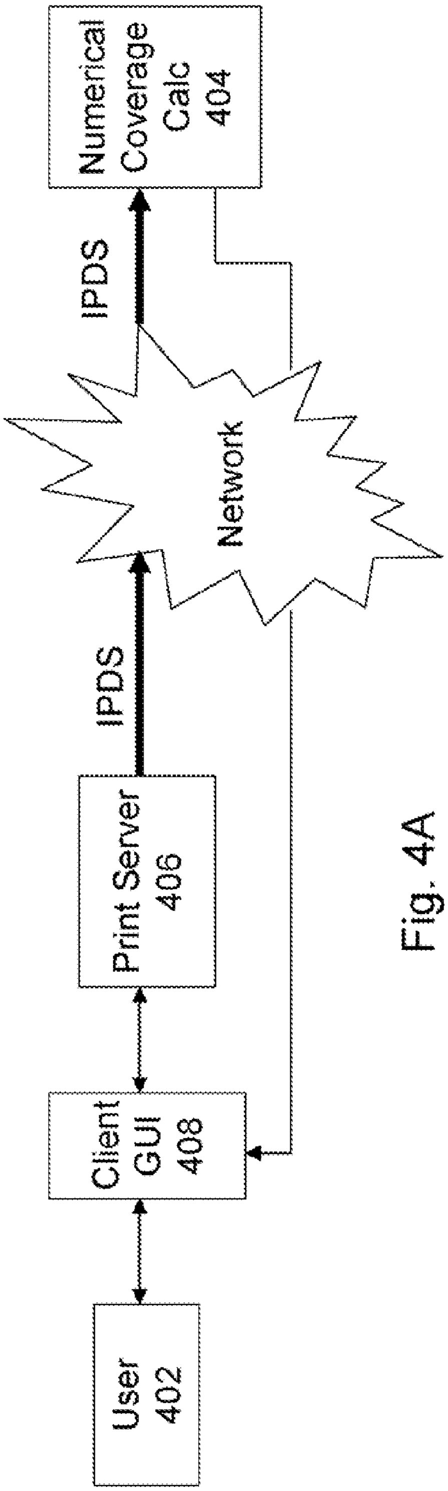
FIGS. 4A and 4B illustrate variations of another embodiment of the present invention.
Figure 4B:
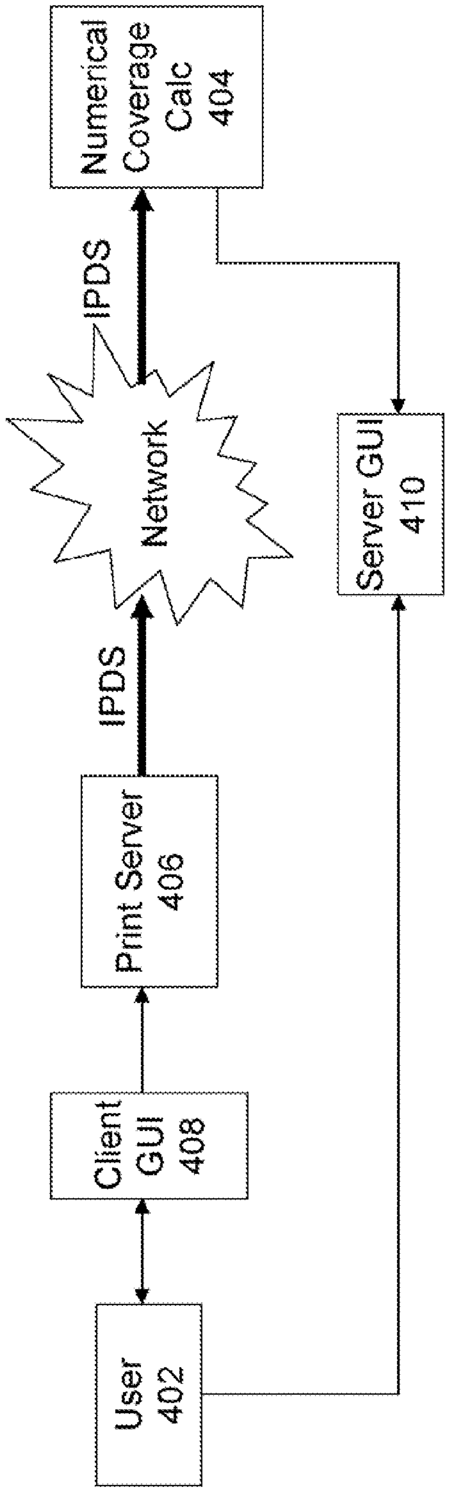

FIGS. 4A and 4B illustrate variations of another embodiment of the present invention in which the user 402 submits a print job through the client device 408. The printer server 406 is selected from a list and the user 402 selects the print job. The client 408 issues the necessary calls to submit the job to the selected printer server 406. The printer server 406 processes the job and outputs TIFF files. The printer server 406 then calls the coverage calculator 404 which processes the TIFF files and outputs one or more files (in any format appropriate for communicating with the requester of the service) specifying toner coverage information for the job. The user 402 may then view completed jobs on the client device 408 and select the one or more results to review (FIG. 4A). Alternatively, the user 402 may view the toner coverage estimate results directly on a server 410 (FIG. 4B). The printer server 406 generates an Intelligent Printer Data Stream (IPDS), or data in another printing protocol, containing information used to identify, monitor, and control the functions of a printer (not shown). It should be understood that without loss of generality the printer server and the printer may be a single integrated device or two independent devices.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of computer readable media actually used to carry out the distribution. Examples of computer readable media include recordable-type media such as a floppy disk, a hard disk drive, a RAM, and GO-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover although described above with respect to methods and systems, the need in the art may also be met with a computer program product containing instructions for generating printer output coverage estimates or a method for deploying computing infrastructure comprising integrating computer readable code into a computing system for generating printer output coverage estimates.

What is claimed is:

1. A method operable on a printer for providing printer colorant usage estimates for printing a print job, the method comprising:

providing, by the printer, a user interface to a user;

receiving, by the printer, a request for a colorant usage estimate for printing the print job;

identifying, by the printer, an external provider of computing services for estimating the colorant usage for printing the print job;

sending, from the printer, the request and information about the printer to the identified external provider of computing services, wherein the information about the printer comprises an electrostatic adjustment for the printer, an age of a developer mix for the printer, and a model of the printer;

receiving, by the printer, the colorant usage estimate from the identified external provider of computing services that is based on the request and the information about the printer; and providing, by the printer, the colorant usage estimate to the user.

2. The method of claim 1, wherein the step of sending further comprises:

sending print job information for estimating the colorant usage for printing the print job, the print job information comprising at least one of:

a ratio of black pixels to a total number of pixels on a printable area of a page from the print job;

a distribution of toner pixels on a page from the print job;

a contrast setting from the print job; and a print quality setting from the print job.

3. The method of claim 1 wherein the method further comprises:

calculating, at the printer, a printing cost of the print job based on the colorant usage estimate from the identified external provider of computing services; and providing, by the printer, the printing cost of the print job to the user.

4. The method of claim 1 wherein the step of sending further comprises:

sending an Intelligent Print Data Stream generated from the print job for estimating the colorant usage for printing the print job.

5. The method of claim 1 wherein the step of identifying further comprises:

identifying the external provider of computing services based on a fee for estimating the colorant usage for printing the print job.

6. The method of claim 1 wherein the step of sending further comprises:

sending a Tagged Image File Format file generated from the print job for estimating the colorant usage for printing the print job.

7. A non-transitory computer readable medium embodying programmed instructions executed by a printer to perform a method of providing colorant usage estimates for printing a print job, the method comprising:

providing a user interface to a user;

receiving a request for a colorant usage estimate for printing the print job;

identifying an external provider of computing services for estimating the colorant usage for printing the print job;

sending the request and information about the printer to the identified external provider of computing services, wherein the information about the printer comprises an electrostatic adjustment for the printer, an age of a developer mix for the printer, and a model of the printer;

receiving the colorant usage estimate from the identified external provider of computing services that is based on the request and the printer information; and providing the colorant usage estimate to the user.

8. The non-transitory computer readable medium of claim 7 wherein the method step of sending further comprises:

sending print job information for estimating the colorant usage for printing the print job, the print job information comprising at least one of:

a ratio of black pixels to a total number of pixels on a printable area of a page from the print job;

a distribution of toner pixels on a page from the print job;

a contrast setting from the print job; and a print quality setting from the print job.

9. The non-transitory computer readable medium of claim 7 wherein the method further comprises:

calculating a printing cost of the print job based on the colorant usage estimate from the identified external provider of computing services.

10. The non-transitory computer readable medium of claim 7 wherein the method step of sending further comprises:

sending an Intelligent Print Data Stream generated from the print job for estimating the colorant usage for printing the print job.

11. The non-transitory computer readable medium of claim 7 wherein the method step of identifying further comprises:

identifying the external provider of computing services based on a fee for estimating the colorant usage for printing the print job.

12. The non-transitory computer readable medium of claim 7 wherein the method step of sending further comprises:

sending a Tagged Image File Format file generated from the print job for estimating the colorant usage for printing the print job.

13. A printer comprising:

a user interface configured to interface with a user and to receive a request for a colorant usage estimate for printing a print job;

a computing resource registry configured to identify an external provider of computing services for estimating the colorant usage for printing the print job;

a resource interface configured to send the request and information about the printer to the identified external provider of computing services, wherein the information about the printer comprises an electrostatic adjustment for the printer, an age of a developer mix for the printer, and a model of the printer, the resource interface further configured to receive the colorant usage estimate from the identified external provider of computing services that is based on the request and the printer information, wherein the user interface is further configured to provide the colorant usage estimate to the user.

14. The printer of claim 13 wherein the printer is configured to calculate a printing cost of the print job based on the colorant usage estimate from the identified external provider of computing services, and to provide the printing cost of the print job to the user.

15. The printer of claim 13 wherein printer is configured to send an Intelligent Print Data Stream generated from the print job for estimating the colorant usage for printing the print job.

16. The printer of claim 13 wherein the computing resource registry is further configured to identify the external provider of computing services based on a fee for estimating the colorant usage for printing the print job.

17. The printer of claim 13 wherein the printer is configured to send a Tagged Image File Format file generated from the print job for estimating the colorant usage for printing the print job.

* * * * *

UNITED STATES PATENT AND TRADEMARK OFFICE

CERTIFICATE OF CORRECTION

PATENT NO. : 8,223,358 B2
APPLICATION NO. : 11/380805
DATED : July 17, 2012
INVENTOR(S) : Czyszczewski et al.

It is certified that error appears in the above-identified patent and that said Letters Patent is hereby corrected as shown below:

In column 4, line 41, the text “a RAM, and GO-ROMs” should read -- a RAM, and CD-ROM --

Signed and Sealed this
Eighteenth Day of December, 2012

David J. Kappos
*Director of the United States Patent and Trademark Office*